US012747055B2

(12) United States Patent
Nishino et al.

(10) Patent No.: US 12,747,055 B2
(45) Date of Patent: Sep. 29, 2026

(54) ASEPTIC CONVEYING SYSTEM

(71) Applicant: SHIBUYA CORPORATION, Kanazawa (JP)

(72) Inventors: Yukinobu Nishino, Kanazawa (JP); Satoshi Masumoto, Kanazawa (JP); Takashi Higashizaki, Kanazawa (JP); Yasuhiro Hashimoto, Kanazawa (JP); Ryota Hayase, Kanazawa (JP)

(73) Assignee: SHIBUYA CORPORATION, Kanazawa-shi (JP)

( * ) Notice: Subject to any disclaimer, the term of this patent is extended or adjusted under 35 U.S.C. 154(b) by 322 days.

(21) Appl. No.: 18/609,093

(22) Filed: Mar. 19, 2024

(65) Prior Publication Data

US 2024/0317442 A1 Sep. 26, 2024

(30) Foreign Application Priority Data

Mar. 22, 2023 (JP) ................................ 2023-045613

(51) Int. Cl.
*B65B 55/10* (2006.01)
*B67C 7/00* (2006.01)

(52) U.S. Cl.
CPC ............ *B65B 55/10* (2013.01); *B67C 7/0053* (2013.01); *B67C 7/0073* (2013.01)

(58) Field of Classification Search
CPC ...... B65B 55/10; B67C 7/0053; B67C 7/0073
See application file for complete search history.

(56) References Cited

U.S. PATENT DOCUMENTS

2021/0179410 A1 6/2021 Takaku et al.

FOREIGN PATENT DOCUMENTS

JP 6330876 B2 4/2018
WO WO-2015158563 A1 * 10/2015 ............... B65B 7/16
WO WO-2018207787 A1 * 11/2018 ............... A61L 2/18

OTHER PUBLICATIONS

English translation of WO 2015158563 (Year: 2015).*
English translation of WO 2018207787 A1 (Year: 2018).*

* cited by examiner

*Primary Examiner* — Sean E Conley
(74) *Attorney, Agent, or Firm* — FLYNN THIEL, P.C.

(57) ABSTRACT

Sterilization is efficiently performed with a small amount of sterilizing agent. A first partition plate separating an upstream zone and a downstream zone is provided with an opening for allowing a container holding section that moves according to rotation of a fifth rotation wheel (transfer rotation wheel) to pass through, and the fifth rotation wheel is disposed across the upstream zone and the downstream zone. A first tunnel that allows the container holding section of the fifth rotation wheel to pass through is provided along a movement path of the container holding section, and a sterilizing nozzle for spraying a sterilizing agent toward the container holding section is provided inside the first tunnel. The first tunnel is provided in the downstream zone, at a position adjacent to the opening where the container holding section passes through at a time of entering the upstream zone from the downstream zone.

4 Claims, 6 Drawing Sheets

ASEPTIC CONVEYING SYSTEM

BACKGROUND OF THE INVENTION

Field of the Invention

The present invention relates to an aseptic conveying system, and more particularly, to an aseptic conveying system where a plurality of rotation wheels, each including a plurality of container holding sections on an outer periphery, are provided inside a chamber that is internally divided into a plurality of zones by partition plates.

Description of the Related Art

For example, conventionally, as an aseptic filling system for filling a container with a beverage, an aseptic conveying system where a plurality of rotation wheels, each including a plurality of container holding sections on an outer periphery, are provided inside a chamber that is internally divided into a plurality of zones by partition plates, and where a container is conveyed by being transferred between the container holding sections of adjacent rotation wheels is used.

With such an aseptic conveying system, an aseptic state has to be maintained at a position where a beverage is poured into a container and at a position where a cap is attached to the container; however, because a container that is filled with a beverage or the like is discharged outside through an opening formed in the chamber, germs and the like floating outside possibly enter the chamber through the opening.

Accordingly, the chamber is divided into a plurality of zones by partition plates, and germs and the like are prevented from entering an upstream chamber, where a filling device and a capper are provided, from a downstream chamber (Japanese Patent No. 6330876).

In Japanese Patent No. 6330876, entry of germs and the like into an upstream zone that is maintained in an aseptic state is prevented by sterilizing a downstream zone (barrier zone) provided on a downstream side of the upstream zone, but because sterilization is performed by spraying a sterilizing agent into the entire downstream zone, there is a problem that a large amount of sterilizing agent is used.

In view of such a problem, the present invention aims to provide an aseptic conveying system that allows sterilization to be efficiently performed with a smaller amount of sterilizing agent.

SUMMARY OF THE INVENTION

An aseptic conveying system according to the invention of claim 1 is an aseptic conveying system where a plurality of rotation wheels, each including a plurality of container holding sections on an outer periphery, are provided inside a chamber that is internally divided into a plurality of zones by a partition plate and where a container is conveyed by being transferred between the container holding sections of adjacent rotation wheels, the aseptic conveying system being characterized in that:

the chamber is divided by the partition plate into an upstream zone that is maintained in an aseptic state, and a downstream zone that is provided adjacent to and on a downstream side of the upstream zone;

a required rotation wheel among the plurality of rotation wheels is disposed as a transfer rotation wheel, and the transfer rotation wheel is provided across the upstream zone and the downstream zone separated by the partition plate;

an opening is formed in the partition plate, the opening allowing a container holding section that moves due to rotation of the transfer rotation wheel to pass through;

a tunnel that allows the container holding section of the transfer rotation wheel to pass through is further provided along a movement path of the container holding section, and a sterilizing nozzle for spraying a sterilizing agent toward the container holding section is provided inside the tunnel; and the tunnel is provided in the downstream zone, at a position adjacent to the opening where the container holding section passes through at a time of entering the upstream zone from the downstream zone.

According to the invention, the upstream zone that is maintained in the aseptic state and the downstream zone that is provided adjacent to and on a downstream side of the upstream zone are separated by the partition plate, and the transfer rotation wheel is disposed across the upstream zone and the downstream zone, and thus, the container holding section that is moved by the transfer rotation wheel passes through the opening provided in the partition plate and moves from the downstream zone to the upstream zone.

At this time, germs and the like are possibly attached to the container holding section moving in the downstream zone, and thus, the tunnel where the container holding section can pass through is provided and the sterilizing nozzle for spraying a sterilizing agent toward the container holding section is provided inside the tunnel to sterilize the container holding section.

Because the sterilizing agent is sprayed in a limited space inside the tunnel, the container holding section that passed through the downstream zone may be sterilized with a small amount of sterilizing agent, and also, because the tunnel is provided in the downstream zone, germs and the like attached to the container holding section may be prevented from entering the upstream zone as much as possible.

DETAILED DESCRIPTION OF THE PREFERRED EMBODIMENT

Figure 1:
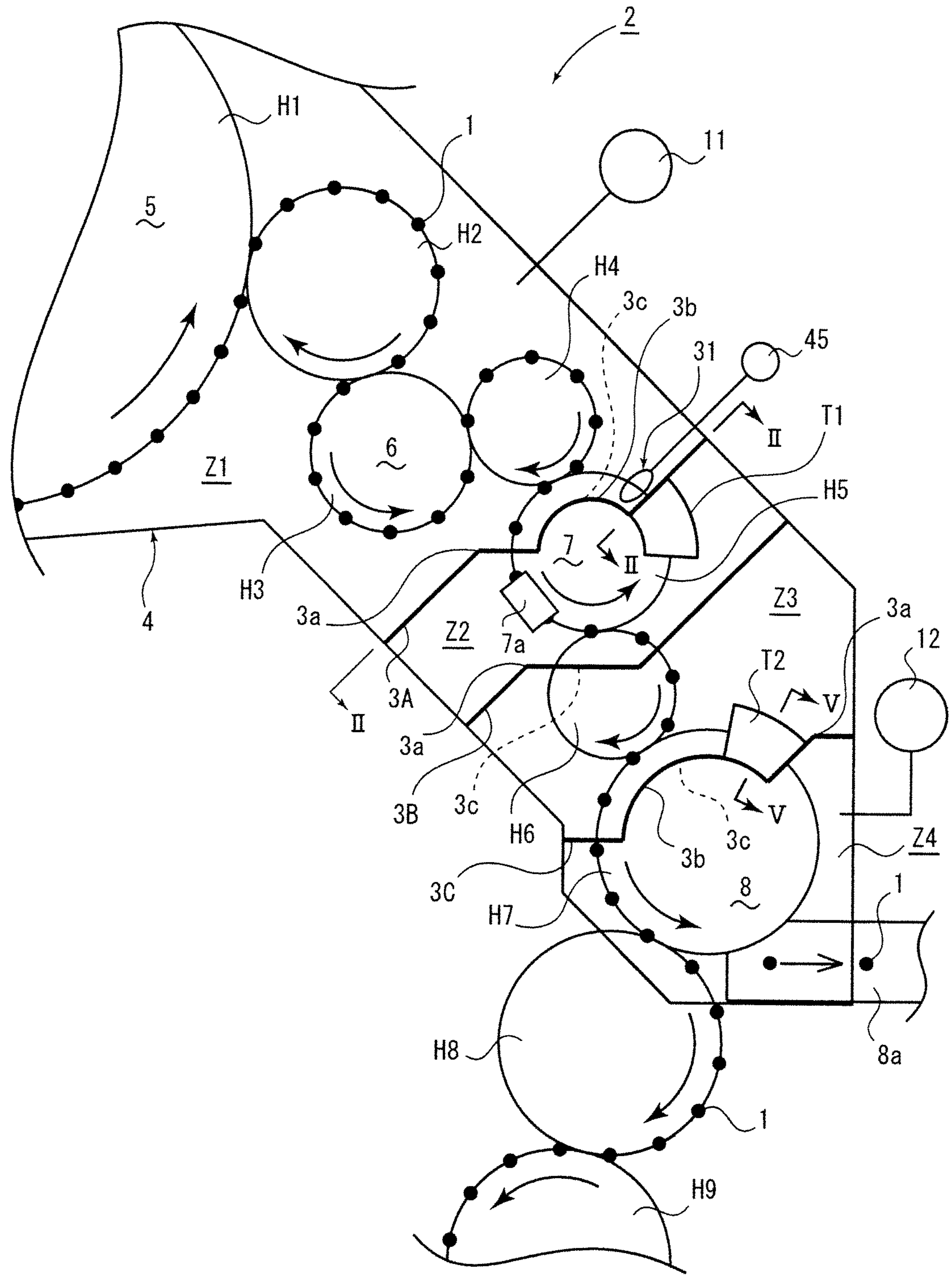
FIG. 1 is a configuration diagram of an aseptic conveying system according to a present embodiment.

Hereinafter, a description will be given of a present embodiment, where FIG. 1 is a plan view showing a downstream part of an aseptic filling system 2 for filling a container 1, such as a plastic bottle, with liquid, such as a beverage, and for performing capping.

The aseptic filling system 2 includes a chamber 4 that is internally divided into a plurality of zones Z (Z1 to Z4) by partition plates 3 (3A to 3C), and a plurality of rotation wheels H (H1 to H7) that are provided inside the chamber 4 and that are for conveying the container 1, and the aseptic conveying system of the present invention is thus configured.

The aseptic filling system 2 of the present embodiment includes first to seventh rotation wheels H1 to H7 in the stated order from an upstream side of a conveying direction of the container 1, and among these, the first rotation wheel H1 configures a filling device 5 that pours liquid into the container 1, the third rotation wheel H3 configures a capper 6 that attaches a cap to the container 1, the fifth rotation wheel H5 configures an examination device 7 that examines the container 1, and the seventh rotation wheel H7 configures a rejection device 8 that ejects the container 1 that is determined to be defective, and these are controlled by control means not shown.

Furthermore, the eighth rotation wheel H8 and the ninth rotation wheel H9 are disposed downstream of the seventh rotation wheel H7, outside the chamber 4, and the container 1 is conveyed downstream after being subjected to filling and capping and determined by examination to be normal.

Additionally, the filling device 5 and the capper 6 are conventionally known and detailed description thereof will be omitted, and also, as the examination device 7, a conventionally known configuration for determining a filled amount of liquid in the container 1 and determining acceptability of capping may be adopted, and thus, detailed description thereof will be omitted.

First to third partition plates 3A to 3C are provided inside the chamber 4, and the chamber 4 is divided into first to fourth zones Z1 to 24 by the first to third partition plates 3A to 3C.

The first to fourth zones Z1 to Z4 communicate with each other by openings formed in the first to third partition plates 3A to 3C, and the container 1 is conveyed by being caused to pass through the openings.

Among these, the first zone Z1 is where the filling device 5 and the capper 6 are provided, and inside of the first zone Z1 is maintained in an aseptic state.

The fourth zone Z4 is where the rejection device 8 is provided, and the fourth zone 24 is formed such that the container 1 is transferred to the eighth and ninth rotation wheels H8, H9 provided outside through an opening formed in the chamber 4. Accordingly, germs and the like possibly enter through the opening from outside, and inside of the fourth zone Z4 is in a non-aseptic state.

The first zone Z1 that is positioned on a most upstream side is maintained at a positive pressure by an air supply blower 11, and the fourth zone 24 that is positioned on a most downstream side is provided with an air discharge blower 12 and inside thereof is set to a negative pressure.

Accordingly, there is a differential pressure between the first zone Z1 and the fourth zone Z4, and pressure is gradually reduced in an order of the first zone Z1, the second zone Z2, the third zone Z3, and the fourth zone Z4.

As described above, a differential pressure is set stepwise from the first zone Z1 to the fourth zone Z4 and the fourth zone Z4 is placed in a negative pressure, and thus, impurities such as germs that enter from outside the chamber 4 may be confined in the fourth zone Z4 and may be prevented from moving to the third zone Z3.

Additionally, the fourth zone Z4 may be placed in an atmospheric pressure instead of the negative pressure, and the pressure may be gradually reduced in the order of the first zone Z1, the second zone Z2, the third zone Z3, and the fourth zone Z4.

The first to ninth rotation wheels H1 to H9 each include a rotatable disk-shaped table 14, and container holding sections 13 that are for holding the container 1 and that are provided at regular intervals on an outer peripheral edge of the table 14 (see FIG. 2), and the first to ninth rotation wheels H1 to H9 are rotated in conjunction with one another by drive means not shown.

In the present embodiment, when the first to ninth rotation wheels H1 to H9 rotate in conjunction with one another, the first, third, fifth, seventh, and ninth rotation wheels H1, H3, H5, H7, H9 rotate anticlockwise in the drawing, and the second, fourth, sixth, and eighth rotation wheels H2, H4, H6, H8 rotate clockwise in the drawing.

Moreover, at a position where adjacent rotation wheels H are close to each other, transfer of the container 1 is performed between respective container holding sections, and the container 1 is thus conveyed from the first rotation wheel H1 to the ninth rotation wheel H9.

Figure 2:
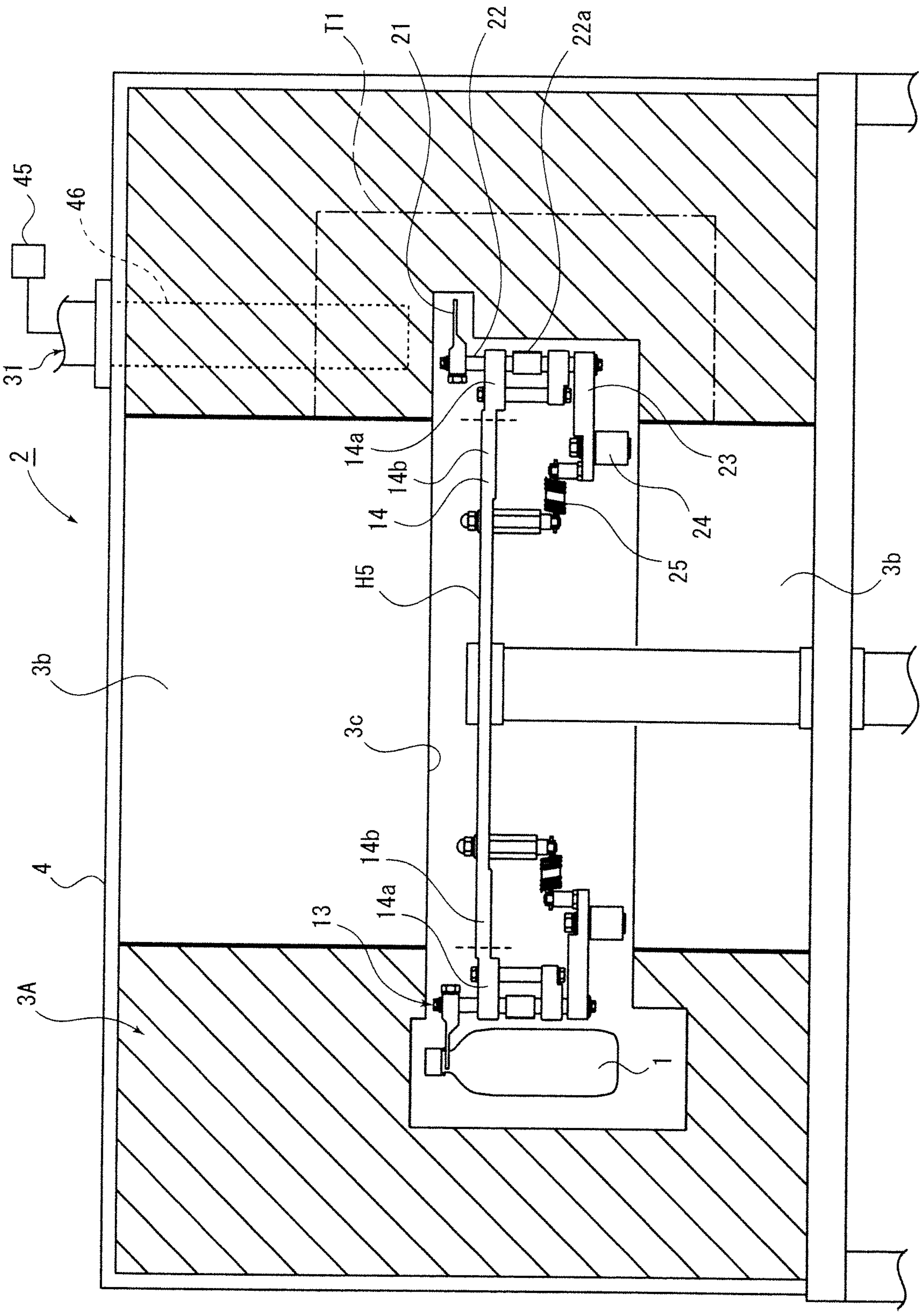
FIG. 2 is a cross-sectional view at a part II-II in FIG. 1.

FIG. 2 shows a cross-sectional view at a part II-II in FIG. 1, and more specifically, shows a cross-sectional view for describing the fifth rotation wheel H5 that configures the examination device 7, the cross-sectional view taken along a position where the first partition plate 3A is provided.

The fifth rotation wheel H5 is formed such that the container holding sections 13 are provided at regular intervals at the outer peripheral edge of the disk-shaped table 14 that is allowed to rotate by a rotation shaft.

The container holding section 13 of the fifth rotation wheel H5 is configured by a conventionally known openable neck gripper, opening/closing of which is controlled by a cam or the like, and the openable neck gripper is also provided at the second, third, and the seventh rotation wheels H2, H3, H7.

The openable neck gripper includes a pair of gripping members 21 that are swingably provided at the outer peripheral edge of the table 14, rotation shafts 22 that pivotally support the gripping members 21, a lever 23 that is provided at a lower end part of one of the rotation shafts 22, and a cam follower 24 that is provided at a tip end of the lever 23.

The rotation shaft 22 is provided with a gear 22*a*, and when the lever 23 provided at the tip end of one of the rotation shafts 22 is moved, the gears 22*a* are rotated in conjunction to open/close the gripping members 21. Furthermore, a spring 25 is fitted on the lever 23, and the gripping members 21 are constantly biased in a closing direction by a biasing force of the spring 25.

Moreover, a cam, not shown, is provided at a height of the cam follower 24 of the fifth rotation wheel H5, and the cam is provided near a position where transfer of the container 1 is performed with the fourth rotation wheel H4 and the sixth rotation wheel H6.

When the container holding section 13 reaches a position where the cam is provided, the cam follower 24 is pushed outward and the lever 23 is caused to swing, and the gripping members 21 are thereby opened/closed so that the container 1 is gripped or released.

Although description using a drawing is omitted, the container holding section of the first rotation wheel H1 configuring the filling device 5 is provided with a spring-type neck gripper for gripping a neck portion of the container 1, where a closed state of the neck gripper is maintained by using a biasing force of a spring.

Furthermore, as the container holding sections of the fourth and sixth rotation wheels H4, H6, pocket-type holders that hold the container 1 by supporting a bottom portion of the container 1 are used.

Additionally, a configuration for transferring the container 1 from an upstream rotation wheel H to a downstream rotation wheel H using such container holding sections is conventionally known, and further description thereof will be omitted. Moreover, a different combination of container holding sections 13 from that of the present embodiment may be provided at the rotation wheels H1 to H9.

Next, a description will be given of the first to third partition plates 3A to 3C.

The first partition plate 3A separates the first zone Z1 as a upstream zone and the second zone Z2 as a downstream zone, and the fifth rotation wheel H5 as a transfer rotation wheel is provided across the first partition plate 3A and forms a transfer rotation wheel according to the present invention that is provided across the first zone Z1 and the second zone Z2.

Furthermore, as shown in FIG. 1, a bent portion 3*a* that is bent in a dog-leg shape, and a bulging portion 3*b* bulging in the first zone Z1 are formed in the first partition plate 3A.

Furthermore, a first tunnel T1 for sterilizing the container holding section 13 of the fifth rotation wheel H5 is provided on the second zone Z2 side of the first partition plate 3A, and discharge device 31 for sucking in atmosphere around the container holding section 13 and discharging the same to outside is provided on the first zone Z1 side of the first partition plate 3A.

The second partition plate 3B separates the second zone Z2 and the third zone Z3, and the sixth rotation wheel H6 is provided across the second partition plate 3B in a manner extending across the second zone Z2 and the third zone Z3. Moreover, the bent portion 3*a* is formed on the second partition plate 3B.

Moreover, the third partition plate 3C separates the third zone Z3 and the fourth zone Z4, and the seventh rotation wheel H7 is provided across the third partition plate 3C in a manner extending across the third zone Z3 and the fourth zone Z4.

Moreover, the bent portion 3*a* and the bulging portion 3*b* bulging in the third zone Z3 are formed in the third partition plate 3C, and a second tunnel T2 for sterilizing the container holding section 13 of the seventh rotation wheel H7 is provided on the third zone Z3 side of the third partition plate 3C.

Furthermore, an opening 3*c* is formed in each of the first to third partition plate 3A to 3C to allow the container holding section 13 and the table 14 holding the container holding section 13 to pass.

The opening 3*c* in the first partition plate 3A will be described. In the opening 3*c* in the first partition plate 3A, a right side part in FIG. 2 shows a part where the container holding section 13 of the fifth rotation wheel H5 enters the first zone Z1 on the upstream side from the second zone Z2 on the downstream side, and at this time, the container holding section 13 no longer holds the container 1 because the container 1 is already transferred to the sixth rotation wheel H6.

By contrast, in the opening 3*c*, a left side part in FIG. 2 shows a part where the container holding section 13 enters the second zone Z2 from the first zone Z1, and at this time, the container holding section 13 holds the container 1 that is received from the fourth rotation wheel H4.

Accordingly, the right side part of the opening 3*c* of the first partition plate 3A in the drawing does not have a shape that allows the container 1 to pass, and the left side part in the drawing has a shape that allows the container 1 that is held to pass.

Such an opening 3*c* is also formed in the second and third partition plates 3B, 3C, and the opening 3*c* in the partition plate 3 is formed to match shapes of the table 14, the container holding section 13, and the container 1, and thus, an upstream zone and a downstream zone are separated with a smallest possible opening.

The bulging portion 3*b* of the first partition plate 3A is provided with a center thereof being at a rotation center of the fifth rotation wheel H5 and is arc-shaped in plan view or, in other words, the bulging portion 3*b* is formed inside a movement track of the container holding section 13 that is moved by the fifth rotation wheel H5.

More specifically, as shown in FIG. 2, the container holding section 13 of the fifth rotation wheel H5 and an outer peripheral edge 14*a* of the table 14 where the container holding section 13 is provided are positioned outside the bulging portion 3*b* formed in the first zone Z1.

Accordingly, the container holding section 13 and the outer peripheral edge 14*a* of the table 14 moving in the first zone Z1 then passes through the opening 3*c* in the first partition plate 3A and enters the second zone Z2, and then passes through the opening 3*c* in the first partition plate 3A again to return to the first zone Z1.

As described above, the container holding section 13 and the outer peripheral edge 14*a* of the table 14 of the fifth rotation wheel H5 alternately move between the first zone Z1 in the aseptic state and the second zone Z2 on the downstream side.

By contrast, an inner part 14*b* that is on an inward side of the outer peripheral edge 14*a* of the table 14 of the fifth rotation wheel H5 is positioned inside the bulging portion 3*b*, and thus, the inner part 14*b* is constantly positioned in the second zone Z2.

Additionally, a direction in which the bulging portion 3*b* of the first partition plate 3A is formed may be the second zone Z2 instead of the first zone Z1. In this case, the inner part 14*b* of the table 14 is constantly positioned in the first zone Z1.

Figure 3:
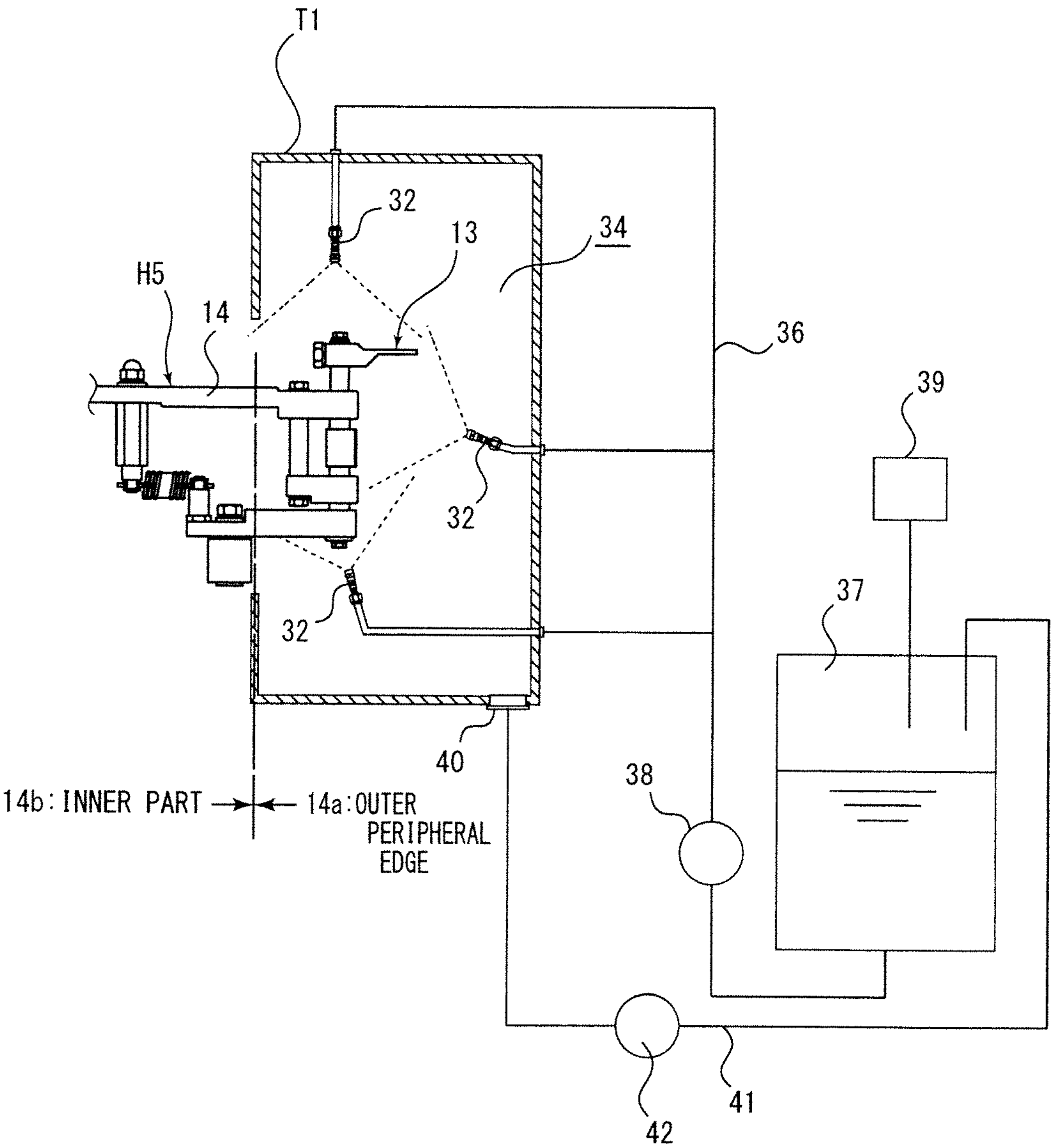
FIG. 3 is a cross-sectional view of a first tunnel.
Figure 4:
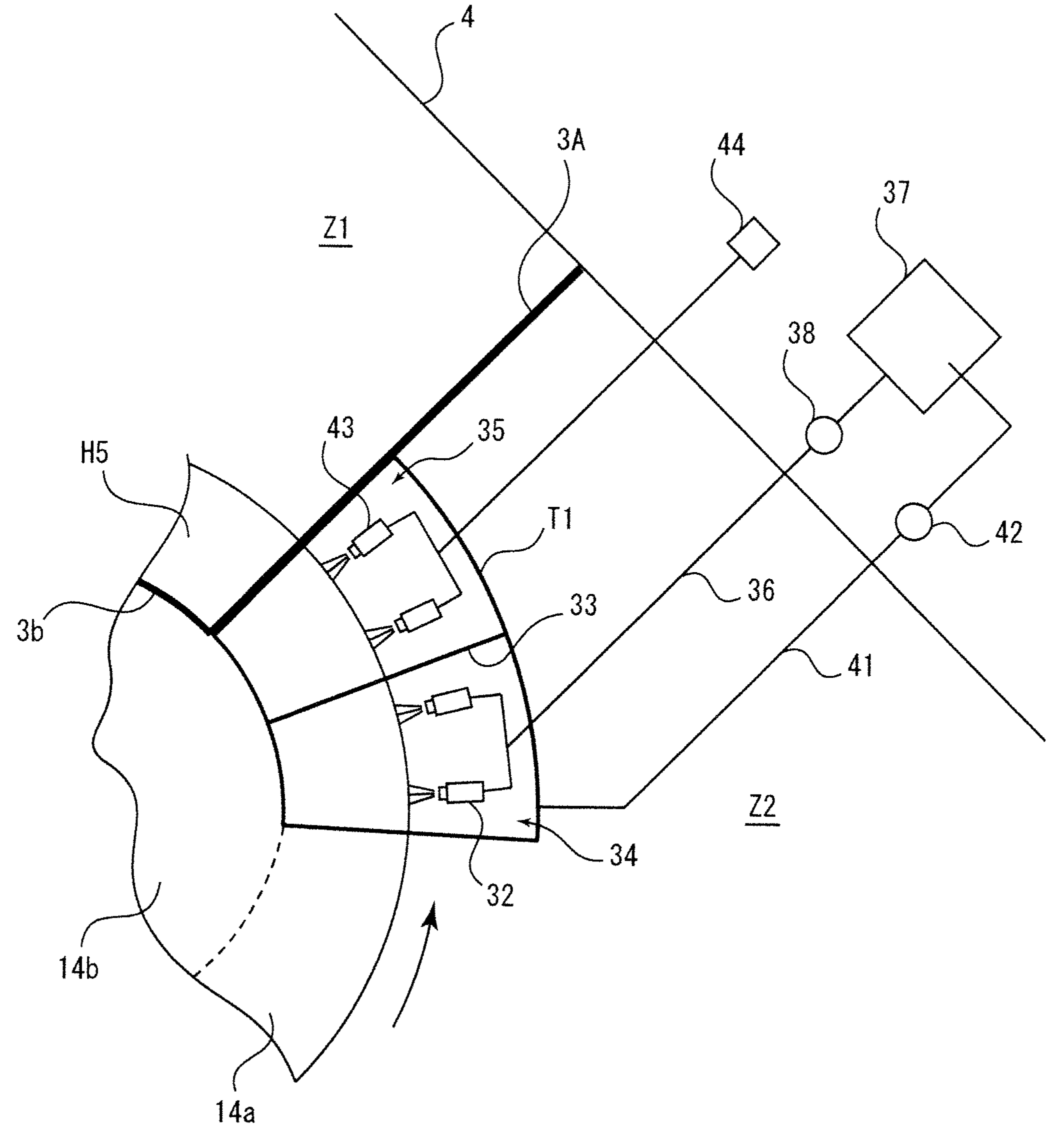
FIG. 4 is a plan view of the first tunnel.

The first tunnel T1 provided on the first partition plate 3A is provided in the second zone Z2, and as shown in FIGS. 3 and 4, a sterilizing nozzle 32 for spraying a sterilizing agent toward the container holding section 13 is provided inside the first tunnel T1.

The first tunnel T1 is provided at a position adjacent to the opening 3*c* that the container holding section 13 passes through when entering the first zone Z1 from the second zone Z2, and the first tunnel T1 has a shape that is curved along a movement path of the container holding section 13 of the fifth rotation wheel H5.

An end portion of the first tunnel T1 on a downstream side of the movement path of the container holding section 13 is connected to the first partition plate 3A (as indicated by a dashed line in FIG. 2), and an exit of the first tunnel T1 is formed by the opening 3*c* in the first partition plate 3A.

An opening having a same shape as the opening 3*c* in the first partition plate 3A is formed in an end portion of the first tunnel T1 on an upstream side of the movement path, and the container holding section 13 enters the first tunnel T1 without being interfered.

Moreover, as shown in FIG. 4, inside of the first tunnel T1 is divided by a dividing wall 33 into spaces on an upstream side and a downstream side of the movement path, and a sterilization section 34 where the sterilizing nozzle 32 is provided is formed in the space on the upstream side, and a sterilizing agent removal section 35 as a sterilizing agent removal device where aseptic air is sprayed on the container holding section 13 is formed in the space on the downstream side.

FIG. 3 is a diagram for describing inside of the sterilization section 34, and the first tunnel T1 includes a top surface and a bottom surface that are positioned above and below the container holding section 13, and includes an inner surface and an outer surface that are positioned on an inner side and an outer side relative to the container holding section 13.

Of these, in the inner surface of the first tunnel T1, a slit having a same width as the opening 3*c* in the first partition plate 3A is formed, and as shown in FIG. 2, a position of the inner surface matches a position of the bulging portion 3*b* of the first partition plate 3A.

Accordingly, parts that are exposed in the first zone Z1 due to the bulging portion 3*b* of the first partition plate 3A, or in other words, the container holding section 13 and the outer peripheral edge 14*a* of the table 14 of the fifth rotation wheel H5, pass inside the first tunnel T1.

Moreover, a plurality of sterilizing nozzles 32 are provided inside the sterilization section 34, and aqueous peracetic acid solution as the sterilizing agent is sprayed onto the container holding section 13 and the outer peripheral edge 14*a* of the table 14 from above, below, and sides.

A reservoir tank 37 containing aqueous peracetic acid solution is connected to each sterilizing nozzle 32 by a supply pipe 36, and a liquid feeding pump 38 is provided on the supply pipe 36. Furthermore, the reservoir tank 37 is provided with sterilizing agent supply device 39 for supplying aqueous peracetic acid solution that is used and reduced.

Moreover, a drainage port 40 is provided at a lower part of the sterilization section 34, and aqueous peracetic acid solution is collected through the drainage port 40 after being sprayed and dropping in the first tunnel T1. The reservoir tank 37 is connected to the drainage port 40 by a return pipe 41, and a liquid feeding pump 42 is provided on the return pipe 41.

Additionally, the sterilizing agent is not limited to the aqueous peracetic acid solution, and various sterilizing agents such as hydrogen peroxide solution and a sterilizing agent obtained by vaporizing hydrogen peroxide solution into gas or mist may be used.

A plurality of spray nozzles 43 for spraying aseptic air are provided in the sterilizing agent removal section 35 in a same arrangement as the sterilizing nozzles 32 in the sterilization section 34, and air supply device 44 is connected to each spray nozzle 43 in the manner shown in FIG. 4.

The container holding section 13 on which the sterilizing agent is sprayed in the sterilization section 34 enters the sterilizing agent removal section 35, and aqueous peracetic acid solution attached to the container holding section 13 is removed by spraying aseptic air on the container holding section 13.

Additionally, aseptic water may be sprayed by the spray nozzle 43 instead of aseptic air, or a plurality of sets of spray nozzles 43 may be provided and aseptic air may be sprayed after aseptic water is sprayed.

The discharge device 31 is provided in the first zone Z1 in the aseptic state, at a position that is adjacent to the opening 3*c* in the first partition plate 3A, on a side where the container holding section 13 of the fifth rotation wheel H5 enters the first zone Z1 from the second zone Z2.

As shown in FIG. 2, the discharge device 31 includes a suction pipe 46 that extends downward from a top surface of the chamber 4, and an air discharge blower 45 that supplies negative pressure in the suction pipe 46.

A lower end opening of the suction pipe 46 is disposed above the opening 3*c* in the first partition plate 3A, on the first zone Z1 side, near a conveying route of the container holding section 13.

This allows air flowing into the first zone Z1 from the second zone Z2 together with the container holding section 13 passing through the opening 3*c* in the first partition plate 3A to be locally suctioned, and diffusion, in the first zone Z1, of atmosphere containing smell and the like of the aqueous peracetic acid solution used in the second zone Z2 may be prevented.

Additionally, one or more suction pipes 46 may be provided, and also, an arrangement position may be a position away from the opening 3*c* instead of a position that is adjacent to the opening 3*c* as long as the position is near the conveying route along which the container holding section 13 is moved from the opening 3*c* to the fourth rotation wheel H4.

Figure 5:
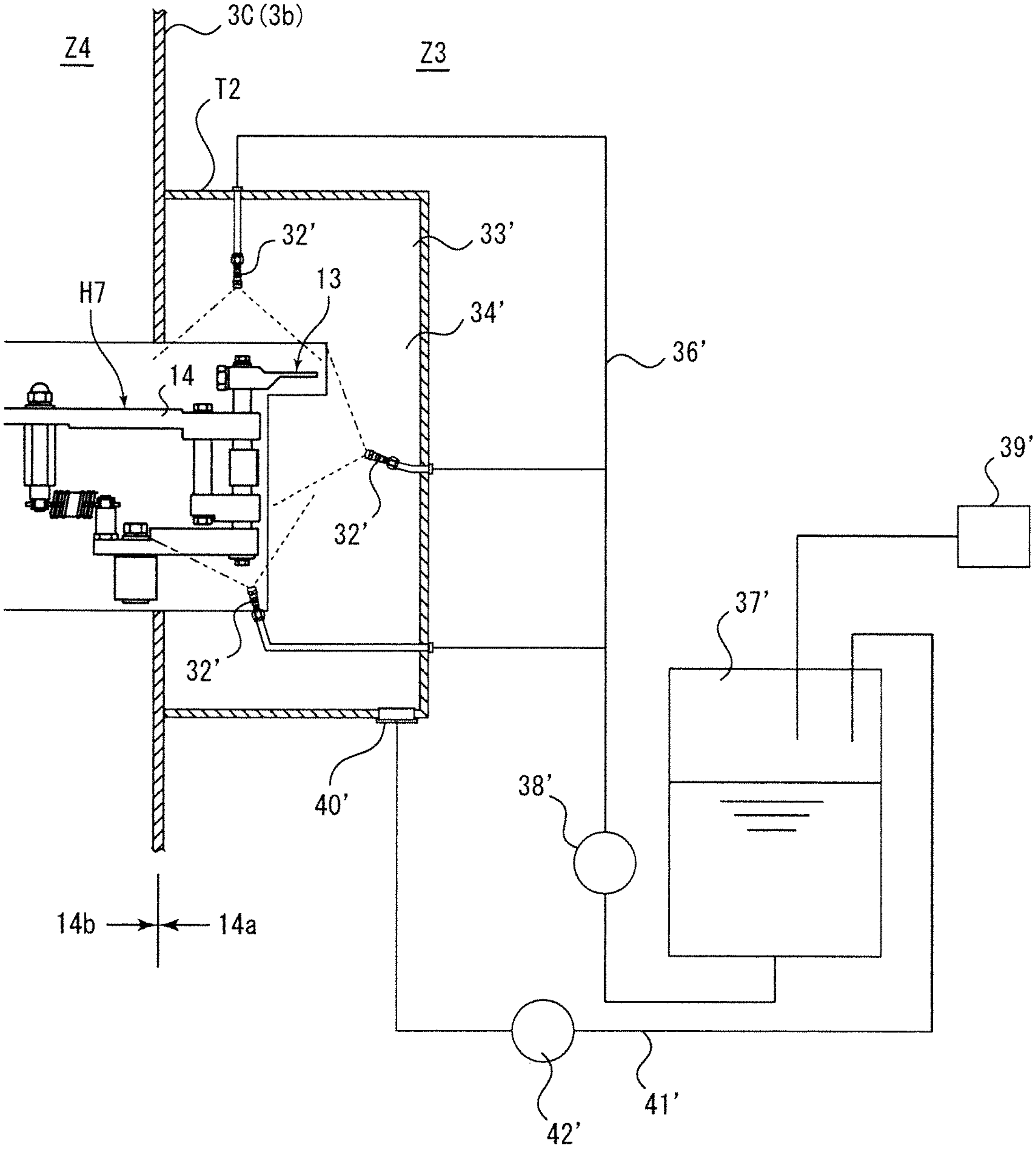
FIG. 5 is a cross-sectional view of a second tunnel.
Figure 6:
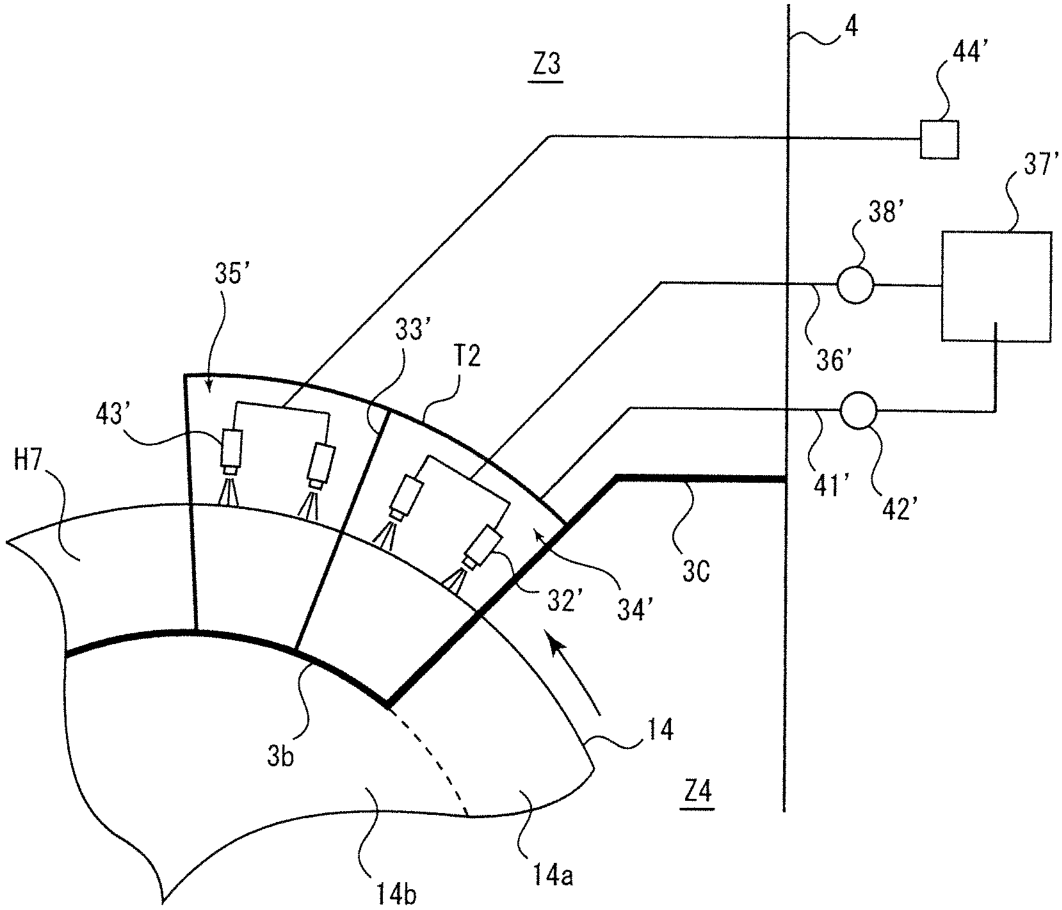
FIG. 6 is a plan view of the second tunnel.

Next, the bulging portion 3*b* of the third partition plate 3C and the second tunnel T2 will be described with reference to FIGS. 5 and 6. FIG. 5 is a cross-sectional view at a part V-V in FIG. 1.

In the present embodiment, the bulging portion 3*b* of the third partition plate 3C bulges toward the third zone Z3, and the bulging portion 3*b* is formed into an arc shape that is centered around a rotation center of the seventh rotation wheel H7.

As in the case of the first partition plate 3A, the container holding section 13 and the outer peripheral edge 14*a* of the table 14 of the seventh rotation wheel H7 are positioned outside the bulging portion 3*b*, and the parts repeatedly enter the third zone Z3 and the fourth zone 24 by passing through the opening 3*c* formed in the third partition plate 3C.

By contrast, the inner part 14*b* of the table 14 of the seventh rotation wheel H7 is positioned inside the bulging portion 3*b*, and the inner part 14*b* is constantly positioned in the fourth zone Z4.

Additionally, like the bulging portion 3*b* of the first partition plate 3A, the bulging portion 3*b* of the third partition plate 3C may bulge toward the fourth zone Z4. In this case, the inner part 14*b* of the table is constantly positioned in the third zone Z3.

The second tunnel T2 is provided in the third zone Z3, and is provided at a position that is adjacent to the opening 3*c* in the third partition plate 3C, on a side where the container holding section 13 of the seventh rotation wheel H7 enters the third zone Z3 on the upstream side from the fourth zone Z4 on the downstream side.

The second tunnel T2 has a same structure as the first tunnel T1 provided on the first partition plate 3A, and a sterilization section 34' where a sterilizing nozzle 32' is provided and a sterilizing agent removal section 35' where a spray nozzle 43' is provided are formed inside the second tunnel T2 while being separated from each other by a dividing wall 33', and a drainage port 40' is provided at a lower part of the sterilization section 34'.

Furthermore, as in the case of the sterilizing nozzle 32 provided in the first tunnel T1, a reservoir tank 37' is connected to the sterilizing nozzle 32' by a supply pipe 36' and aqueous peracetic acid solution is supplied by a liquid feeding pump 38', and sterilizing agent supply device 39' is connected to the reservoir tank 37'.

Furthermore, as in the case of the spray nozzle 43 provided in the first tunnel T1, air is supplied to the spray nozzle 43' by air supply device 44'. Additionally, with respect to the reservoir tank 37' and the air supply device 44', those connected to the sterilizing nozzle 32 and the spray nozzle 43 in the first tunnel T1 may be shared and used.

Because the second tunnel T2 is provided in the third zone Z3, an end portion of the second tunnel T2, on an upstream side in a movement direction of the seventh rotation wheel H7, is connected to the third partition plate 3C, and an inner surface of the second tunnel T2 is formed by the bulging portion 3*b*.

According to such a configuration, when the container holding section 13 passes through the opening 3*c* in the third partition plate 3C and enters the second tunnel T2 from the fourth zone Z4 due to rotation of the seventh rotation wheel H7, a sterilizing agent is sprayed in the sterilization section 34' and the sterilizing agent is removed in the sterilizing agent removal section 35'.

Then, the container holding section 13 passes through the second tunnel T2 and enters the third zone Z3. The container holding section 13 and the outer peripheral edge 14*a* of the table 14 that are sprayed with the sterilizing agent in the sterilization section 34' enter the third zone Z3, and the inner part 14*b* of the table 14 that is not sprayed with the sterilizing agent is not exposed in the third zone Z3.

Additionally, the second tunnel T2 may be provided in the third zone Z3 as in the present embodiment, or may be provided in the fourth zone Z4, which is a downstream side.

By contrast, the first tunnel T1 should be provided in the second zone Z2 because the filling device and the like are provided in the first zone Z1 and the aseptic state has to be maintained.

In the following, operation of the aseptic filling system 2 having the structure described above will be described. Additionally, operation of the filling device 5, the capper 6 and the like is conventionally known and description thereof will be omitted, and operation of the aseptic conveying system according to the present invention will be described.

Liquid is poured into the container 1 at the first rotation wheel H1 configuring the filling device 5, and then, when the container 1 is transferred to the third rotation wheel H3 configuring the capper 6 via the second rotation wheel H2, a cap is attached to the container 1.

Next, the container 1 is transferred from the third rotation wheel H3 to the fifth rotation wheel H5 via the fourth rotation wheel H4, and at this time, the container 1 is transferred in the first zone Z1 that is maintained in the aseptic state, but the container 1 is then conveyed to the second zone Z2 by passing through the opening 3*c* in the first partition plate 3A due to rotation of the fifth rotation wheel H5.

In the second zone Z2, examination of the container 1 is performed by the examination device 7 configured by the fifth rotation wheel H5, and an examination result is stored in the control means on a per container 1 basis.

Then, the container 1 held by the fifth rotation wheel H5 is transferred to the sixth rotation wheel H6, and then, the container 1 held by the container holding section 13 of the sixth rotation wheel H6 passes through the opening 3*c* in the second partition plate 3B, and is conveyed to the third zone Z3, which is a gray zone.

Germs and the like are possibly floating in the third zone Z3, which is a gray zone, and thus, the germs and the like possibly get attached to the container holding section 13 of the sixth rotation wheel H6.

Because transfer of the container 1 is performed between the fifth rotation wheel H5 and the sixth rotation wheel H6, the germs and the like possibly get attached also to the container holding section 13 of the fifth rotation wheel H5.

When the container 1 is transferred to the sixth rotation wheel H6, the container holding section 13 of the fifth rotation wheel H5 returns to the first zone Z1, and thus, there is a possibility that the first zone Z1 gets polluted by the germs and the like attached to the container holding section 13.

Accordingly, in the present embodiment, the first tunnel T1 where the sterilizing nozzle 32 is provided is provided on the first partition plate 3A as a partition plate for the present invention that separates the first zone Z1, as an upstream zone, that is maintained in the aseptic state and the second zone Z2 as a downstream zone on a downstream side of the first zone Z1.

That is, due to rotation of the fifth rotation wheel H5 as the transfer rotation wheel, the container holding section 13 of the fifth rotation wheel H5 enters the first tunnel T1 provided on the second zone Z2 side than the first partition plate 3A after transferring the container 1 to the sixth rotation wheel H6.

Then, in the first tunnel T1, the sterilizing nozzle 32 provided in the sterilization section 34 first sprays aqueous peracetic acid solution, and then, the spray nozzle 43 sprays aseptic air in the sterilizing agent removal section 35.

Accordingly, the container holding section 13 is sterilized and the attached aqueous peracetic acid solution is removed, and the container holding section 13 in this state passes through the first partition plate 3A and enters the first zone Z1.

Furthermore, when the container holding section 13 enters the first zone Z1, the discharge device 31 removes air around the container holding section 13, and thus, even if smell or the like of the aqueous peracetic acid solution enters the first zone Z1 in conjunction with movement of the container holding section 13, diffusion of atmosphere of the aqueous peracetic acid solution in the first zone Z1 is prevented.

Furthermore, in the present embodiment, the first partition plate 3A is provided with the bulging portion 3*b*, and the container holding section 13 and the outer peripheral edge 14*a* of the table 14 of the fifth rotation wheel H5 are positioned on an outer peripheral side of the bulging portion 3*b*.

The aqueous peracetic acid solution is sprayed on the container holding section 13 and the outer peripheral edge 14*a* of the table 14 of the fifth rotation wheel H5 in the first tunnel T1, and thus, when the sterilized container holding section 13 and the sterilized outer peripheral edge 14*a* of the table 14 then enter the first zone Z1, the first zone Z1 is not polluted.

The inner part 14*b* of the table 14 stays in the second zone Z2 on an inner side of the bulging portion 3*b*, and thus, the inner part 14*b* is not exposed in the first zone Z1, and the part does not have to be sterilized.

As described above, a range to be sterilized with the sterilizing agent can be limited, and sterilization of a part exposed in the first zone Z1 may be performed with a small amount of sterilizing agent.

Next, the container 1 transferred to the container holding section 13 of the sixth rotation wheel H6 is conveyed to the third zone 23 by passing through the opening 3*c* in the second partition plate 3B, and is then transferred to the seventh rotation wheel H7 as the rejection device 8.

The container holding section 13 of the seventh rotation wheel H7 receiving the container 1 in the third zone Z3 then passes through the third partition plate 3C and enters the fourth zone Z4.

Then, depending on an examination result from the examination device 7, the container 1 is transferred to the eighth rotation wheel H8 or a rejection conveyor 8*a*.

That is, the container 1 that is determined to be good is conveyed to a labeler, not shown, by the eighth rotation wheel H8 and the ninth rotation wheel H9, and the container 1 that is determined to be defective is discharged to the rejection conveyor 8*a* and is collected in a rejection box not shown.

Because the eighth rotation wheel H8 and the rejection conveyor 8*a* are provided outside the chamber 4, germs and the like outside can easily enter through the opening formed in the chamber 4, and the fourth zone Z4 is a non-aseptic environment.

Accordingly, there is a possibility that germs and the like get attached to the seventh rotation wheel H7 provided in the fourth zone Z4.

Accordingly, the second tunnel T2 provided with the sterilizing nozzle 32' is provided on the third partition plate 3C that is provided between the fourth zone Z4, which is a downstream side in a non-aseptic environment, and the third zone Z3 as an upstream side of the fourth zone Z4, such that the container holding section 13 of the seventh rotation wheel H7 is sterilized.

That is, by providing the second tunnel T2 at a position where the container holding section 13 enters the third zone Z3 from the fourth zone Z4 and by sterilizing the container holding section 13, germs and the like may be prevented from entering the third zone Z3 from the non-aseptic environment.

Furthermore, also with respect to the third partition plate 3C, because the bulging portion 3*b* is provided and an area where the sterilizing agent is sprayed can be limited to the container holding section 13 and the outer peripheral edge 14*a* of the table 14 of the seventh rotation wheel H7, an amount of sterilizing agent that is used may be suppressed.

Additionally, in the embodiment described above, the third partition plate 3C is provided with the bulging portion 3*b*, and also, the second tunnel T2 is provided, and the container holding section 13 of the seventh rotation wheel H7 moving from the fourth zone 24 to the third zone Z3 is sterilized.

It is also possible to provide the second partition plate 3B with the bulging portion 3*b* and the second tunnel T2 such that the container holding section of the sixth rotation wheel H6 moving from the third zone Z3 to the second zone Z2 is sterilized.

That is, the third zone 23 that is a gray zone may be assumed to be a non-aseptic environment, and the container holding section entering the second zone Z2 that is upstream side may be sterilized. In this case, the bulging portion 3*b* and the second tunnel T2 of the third partition plate 3C may be omitted.

Furthermore, in the embodiment described above, the chamber 4 is divided into the first to fourth zones Z1 to 24 by the first to third partition plates 3A to 3C, but the first partition plate 3A may be omitted and the first and second zones Z1, Z2 in the embodiment described above may be made one aseptic zone, for example.

In this case, the second partition plate 3B according to the embodiment described above is provided with the first tunnel T1 provided with the sterilizing nozzle 32, and with the bulging portion 3*b*, and the first and second zones Z1, Z2 that are combined are made the upstream side zone, and entrance of germs from the third zone Z3 that is downstream side zone and the gray zone may be prevented.

Moreover, in the embodiment described above, the first and second tunnels T1, T2 provided with the sterilizing nozzles 32, 32' are arranged, but the second tunnel T2 may be omitted.

REFERENCE SIGNS LIST

1 container
2 aseptic filling system
3A first partition plate (partition plate)
3*b* bulging portion
3*c* opening
4 chamber
13 container holding section
14 table
14*a* outer peripheral edge
14*b* inner part
31 discharge device
32 sterilizing nozzle
H5 fifth rotation wheel (transfer rotation wheel)
T1, T2 first, second tunnel
Z1 first zone (upstream zone)
Z2 second zone (downstream zone)

What is claimed is:

1. An aseptic conveying system where a plurality of rotation wheels, each including a plurality of container holding sections on an outer periphery, are provided inside a chamber that is internally divided into a plurality of zones by a partition plate and where a container is conveyed by being transferred between the container holding sections of adjacent rotation wheels, wherein:

the chamber is divided by the partition plate into an upstream zone that is maintained in an aseptic state, and a downstream zone that is provided adjacent to and on a downstream side of the upstream zone;

a required rotation wheel among the plurality of rotation wheels is disposed as a transfer rotation wheel, and the transfer rotation wheel is provided across the upstream zone and the downstream zone separated by the partition plate;

an opening is formed in the partition plate, the opening allowing a container holding section that moves due to rotation of the transfer rotation wheel to pass through;

a tunnel that allows the container holding section of the transfer rotation wheel to pass through is further provided along a movement path of the container holding section, and a sterilizing nozzle for spraying a sterilizing agent toward the container holding section is provided inside the tunnel; and the tunnel is provided in the downstream zone, at a position adjacent to the opening where the container holding section passes through at a time of entering the upstream zone from the downstream zone;

wherein after the container holding section of the transfer rotation wheel transfers a container to an adjacent rotation wheel of the plurality of rotation wheels on the downstream side, the container holding section not holding the container is sprayed with the sterilizing agent by the sterilizing nozzle while passing through the tunnel, and further, the container holding section sprayed with the sterilizing agent enters the upstream zone via the opening.

2. The aseptic conveying system according to claim 1, wherein an end portion, of the tunnel, on a downstream side of the movement path of the container holding section is coupled to the partition plate.

3. The aseptic conveying system according to claim 2, wherein a sterilizing agent removal device is provided inside the tunnel, on a downstream side of the sterilizing nozzle, the sterilizing agent removal device being for spraying aseptic air or aseptic water on the container holding section on which the sterilizing agent is sprayed by the sterilizing nozzle.

4. The aseptic conveying system according to claim 1, wherein a discharge device for discharging atmosphere around the container holding section to outside when the container holding section enters the upstream zone from the downstream zone is provided near the movement path of the container holding section.

* * * * *